Oct. 23, 1962
H. O. MOORE
3,059,370
FISHLINE CASTING APPARATUS
Filed April 5, 1960
2 Sheets-Sheet 1
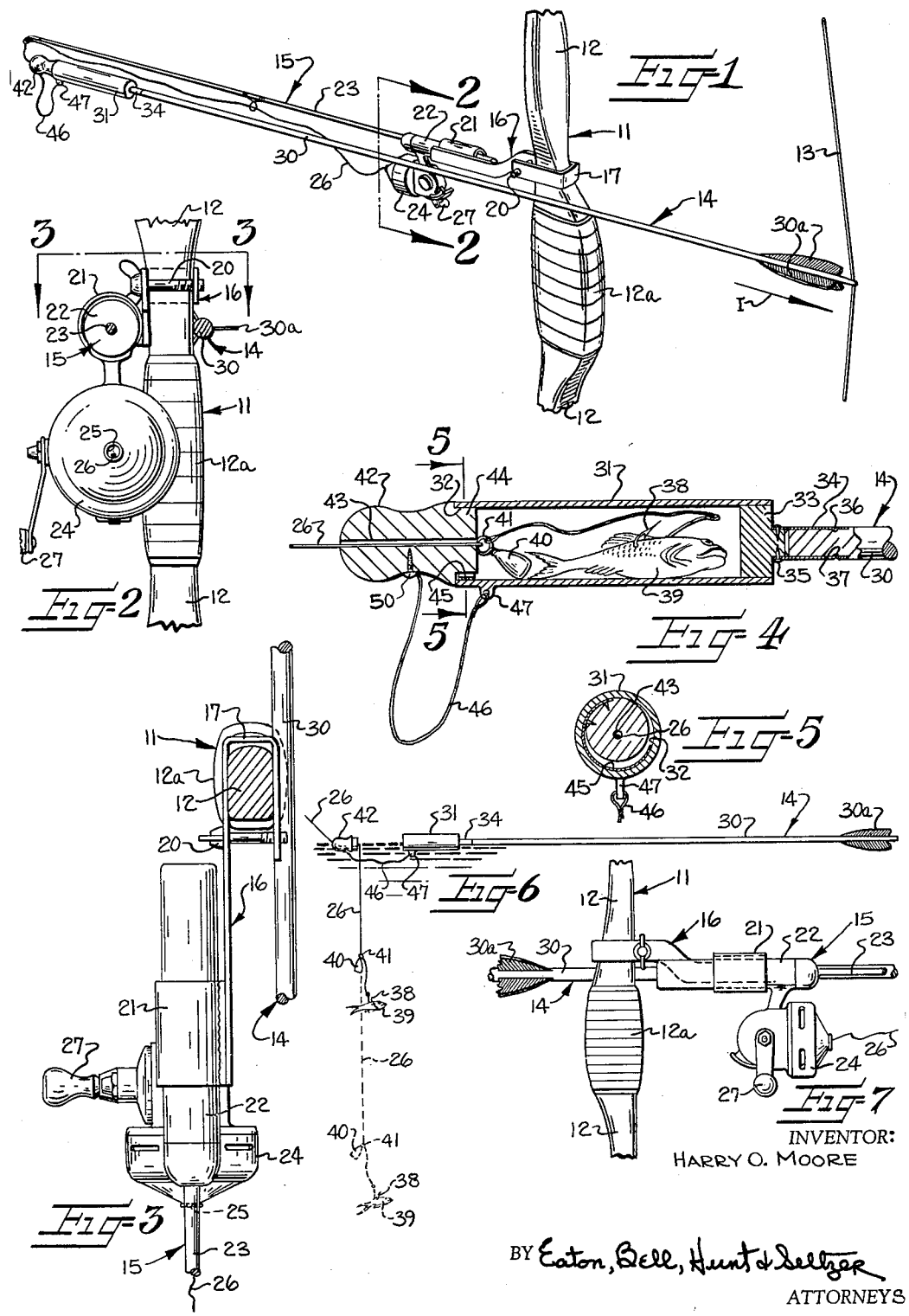
INVENTOR:
HARRY O. MOORE
BY Eaton, Bell, Hunt & Seltzer
ATTORNEYS Oct. 23, 1962     H. O. MOORE     3,059,370
FISHLINE CASTING APPARATUS
Filed April 5, 1960     2 Sheets-Sheet 2
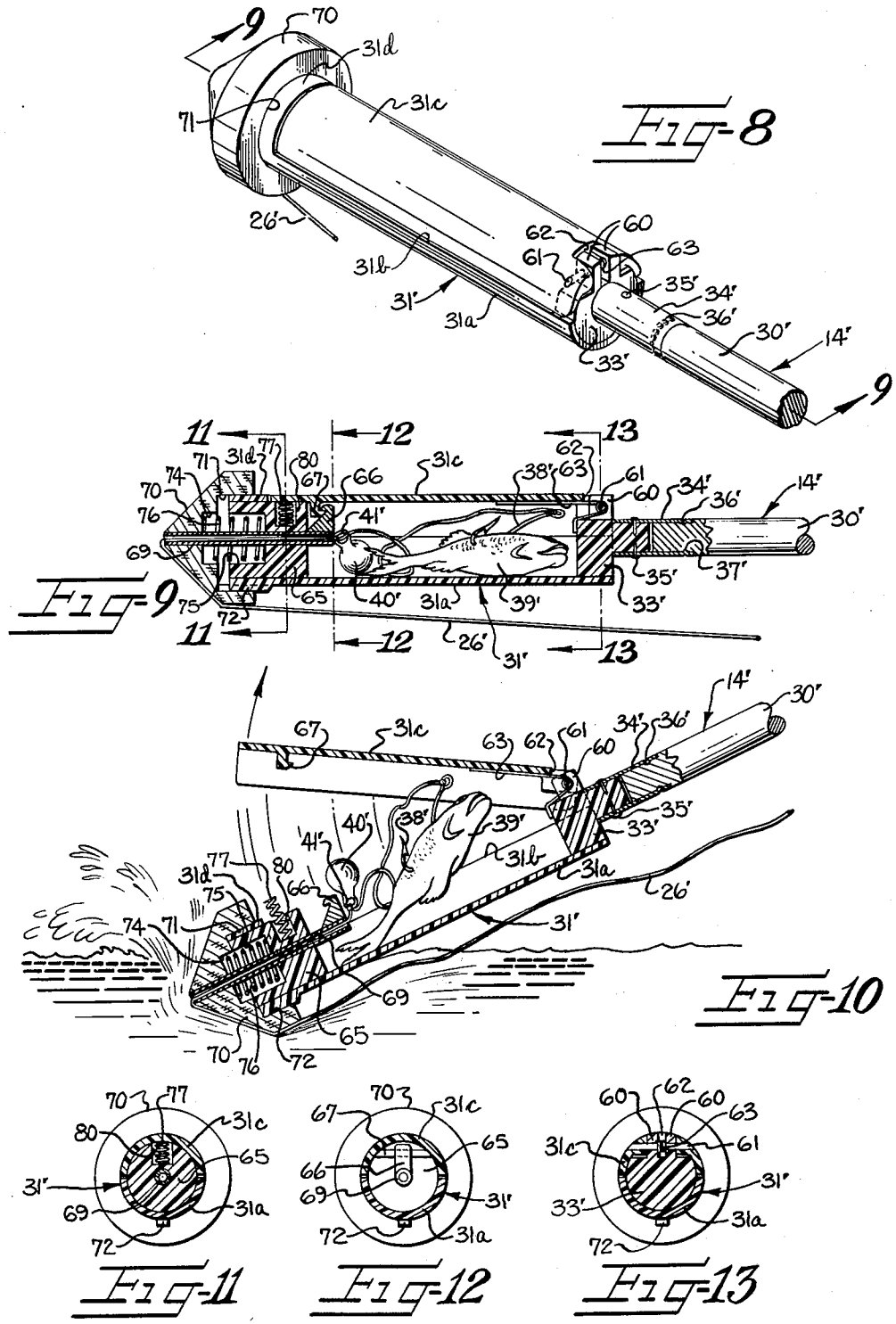

United States Patent Office 3,059,370
Patented Oct. 23, 1962

3,059,370
FISHLINE CASTING APPARATUS
Harry O. Moore, 2921 Rozzells Ferry Road,
Charlotte, N.C.
Filed Apr. 5, 1960, Ser. No. 20,157
5 Claims. (Cl. 43—19)

This invention relates to fishing apparatus and more particularly to apparatus for projecting a baited hook over a substantial casting distance without attendant damage to the bait.

It is well known that, in the sport of fishing, the pleasure of the sport is considerably enhanced when the bait or lure may be cast for considerable distances into the water to be fished. When casting is done manually, particularly when light tackle is employed, there is a limit to the distance at which such cast can be made. Therefore, projecting means for the fishline have frequently been utilized to provide additional force in the casting of the fishline to increase the casting distances.

For example, it has been proposed to utilize a bow and arrow with the fishline attached to the arrow so that when the arrow is projected the fishline is carried therewith to a considerable distance over the water to be fished. One of the distinct disadvantages of such a bow and arrow arrangement is that, when fragile bait such as live bait or the like is hung from the hook, the velocity of the arrow during flight frequently damages or dislodges the bait from the hook with the attendant loss of the bait.

The likelihood of damage or loss of the bait during casting has been recognized in conventional casting rods and devices are presently available which may be attached to the end of the fishline for containing bait. These devices may be cast in the conventional manner and the baited hook released from the device when the device has struck the water. However, these baited hook protecting devices are generally bulky and are of complex construction. Furthermore, with the use of such present day devices, the strength of the fisherman must be relied upon for the propelling force during the casting operation and their heavy weight reduces the distance to which they can be cast.

Accordingly, a primary object of the invention is to provide a new and novel bait casting device which permits a fishline having a baited hook on the end to be projected across a considerable water distance without damage to the bait.

Another object of the invention is to provide a new and novel bait protecting device for use with fishline casting apparatus which prevents damage to the bait and which may be readily positioned on the forward end of an arrow for projection by a bow over a considerable water distance during a casting operation.

Another object of the invention is to provide a novel fishing apparatus utilizing a bow and arrow which is employed to project a baited fishline over considerable water distances and at the same time permits the baited hook to be readily released for fishing at any suitable depth, which depth is controlled by the fisherman without loss of any of the parts of the fishing apparatus.

Still another object of the invention is to provide a novel fishing apparatus which is simple and inexpensive in construction, which may be easily and accurately manipulated for casting baited hooks over considerable water distances, and which permits fishing to be conducted at selected depth in the water with a conventional rod and reel.

It is a more specific object of this invention to provide a fishing apparatus in the form of an arrow adapted to be projected through the air by a bow. The forward end of the arrow has a hollow receptacle fixed thereon provided with a movable closure means to facilitate inserting a baited hook in the receptacle. The closure means is releasably held in closed position. The hook is attached to a fishline which extends outwardly through the receptacle to a reel preferably carried by a conventional fishing rod detachably connected to the bow. When the baited hook is positioned in the receptacle, the projection of the arrow by the bow carries the fishline across the water without dislodging the baited hook from the receptacle. Means are provided for opening the closure means when the arrow lands in the water so that the baited hook is released from the receptacle and may then be lowered to any desired depth in the water.

In one embodiment of the invention, a float serves as the closure means. The float is loosely penetrated by the fishline and is releasably mounted in an opening at the free end of the receptacle so that, upon a pulling force being exerted on the fishline by the fisherman, the float and baited hook are removed from the receptacle. In another embodiment of the invention, the receptacle is provided with an outwardly biased nose which normally retains a closure member, at one side of the receptacle, in closed position over an access opening. The fishline extends through the nose and, upon the nose striking the water, it is depressed relative to the body of the receptacle, and this releases the closure member so the baited hook passes outwardly through the access opening.

Some of the objects of the invention having been stated, other objects will appear as the description proceeds when taken in connection with the accompanying drawings, in which—

FIGURE 1 is a partial isometric view of one embodiment of the novel fishline casting apparatus incorporating a bow and arrow constructed in accordance with the invention;

FIGURE 2 is an enlarged fragmentary sectional view taken substantially along line 2—2 of FIGURE 1 in the direction of the arrows;

FIGURE 3 is a fragmentary sectional plan view taken substantially along line 3—3 of FIGURE 2 in the direction of the arrows;

FIGURE 4 is an enlarged longitudinal sectional view through the receptacle at the forward portion of the staff of the arrow shown in FIGURE 1;

FIGURE 5 is a transverse sectional view through the receptacle and float taken substantially along line 5—5 of FIGURE 4 in the direction of the arrows;

FIGURE 6 is a view of a portion of the fishing apparatus of the invention shown floating in the water to be fished;

FIGURE 7 is a fragmentary view of the fishing rod support looking at the opposite side thereof from that shown in FIGURE 1;

FIGURE 8 is a partial isometric view of a portion of an arrow similar to that shown in FIGURE 1, but showing a second form of receptacle construction;

FIGURE 9 is a longitudinal view through the second form of receptacle and the front end of the arrow, taken along line 9—9 in FIGURE 8;

FIGURE 10 is a view similar to FIGURE 9, but showing the receptacle upon its impact with a body of water and showing the closure means in partially open position;

FIGURES 11, 12 and 13 are transverse sectional views taken along lines 11—11, 12—12 and 13—13, respectively, in FIGURE 9.

Referring more specifically to the drawings, there is shown in FIGURE 1 a suitable bow, designated generally by the numeral 11, of the type commonly used in archery or the like and which includes a shaft 12 having a handgrip 12a and a string 13. An arrow constructed in accordance with the invention and designated generally by the numeral 14 is associated with the bow 11 and is arranged to be projected thereby in the conventional manner. A fishing rod designated generally by the numeral 15 is adapted to be detachably mounted on the bow shaft 12 by means of a bracket designated generally by numeral 16.

The bracket 16 is provided with a U-shaped portion 17 whose legs straddle the bow shaft 12 and which is securely held in the mounted position shown by means such as a thumb screw 2 threadably engageable with the bracket portion 17 as shown best in FIGURE 3. The bracket 16 is also provided with a tubular socket 21 for receiving the handle 22 of the fishing rod 15. The fishing rod 15 is provided with a pole 23 and a reel 24 preferably of the type known as a spinning reel.

As shown best in FIGURE 3, the reel 24 contains a central opening 25 for accommodating a fishline 26. As is well known, the fishing reel 24 contains a suitable holder or spool therein, not shown, on which the fishline 26 may be wound and unwound therefrom in a series of uniform spiral-like convolutions which straighten out in a long linear direction generally parallel to the central or longitudinal axis of the reel as the line passes through the reel opening 25. The reel is also provided with a manual operating handle 27 for winding the fishline 26 onto the holder within the reel 24.

As specifically illustrative of the invention, attention is directed to FIGURES 1 and 4 wherein the arrow 14 includes a shaft or shank 30 which is provided with stabilizing feathers 30a or the like on its rear end, and on the forward end of which is mounted a first form of the improved receptacle 31 having an open end 32. As shown in FIGURE 4, the receptacle 31 is preferably tubular in shape and may be formed of any suitable material such as metal, plastic, or the like.

In order to secure the receptacle 31 to the arrow 14, a plug 33 is positioned in one end of the receptacle. The plug 33 is attached to the forward end of the arrow shaft 30 by means of a sleeve 34 secured to the receptacle plug 33 by means such as nails 35. The receptacle is preferably arranged so that it may be readily detached from the forward end of the arrow and, to this end, the sleeve 34 is indented at 36 to yieldingly engage within suitable recesses 37 in the arrow shaft 30.

The receptacle 31 is arranged to accommodate fish ensnaring means embodied in a hook 38 secured to the free end of the fishline 26 and the hook 38 may be baited by live bait 39, such as a minnow, spinner or the like, also receivable with the hook 38 in the receptacle 31. The receptacle 31 also accommodates a weight or sinker 40 secured to the fishline 26 adjacent the hook 38 as shown in FIGURE 4 by means such as a ring 41.

Closure means are provided for retaining the sinker 41 and the baited hook 37 within the receptacle 31. The closure means is embodied in a buoyant closure member or float 42, preferably formed from floating material such as cork, wood or the like. The float 42 is provided with a passageway or central bore 43 through which the fishline 26 is arranged to pass in loose fitting relationship therewith. The float 42 is also provided with a neck or reduced portion 44 arranged to be inserted within the open end 32 of the receptacle 31. The neck portion 44 is provided with an arcuate spring member 45 as shown best in FIGURE 5 to frictionally and releasably retain the float 42 in the closing position of FIGURE 4.

In order to avoid losing the arrow 14 when the fishline has been cast, a connection is provided between the receptacle 31 and the float 42 which, in the specific embodiment illustrated, comprises a flexible or pliable connector such as a line 46 connected to the receptacle 31 by means of an eye 47 and to the float 42 by a screw 50.

When the fishline casting apparatus of the invention is to be employed by a fisherman, the hook 38 on the fishline 26 is baited with suitable bait such as the minnow 39. The baited hook 38 and sinker 40 are then inserted within the receptacle 31. The neck 44 of float 42 is then inserted in the open end 32 of receptacle 31 as shown in FIGURE 4, and the rod 15 is mounted as shown in FIGURE 1 onto the bow 11 by the insertion of the rod handle 22 within the bracket socket 21.

The arrow 14 is then placed in the projecting position of FIGURE 1 with the hand of the fisherman on the grip 12a of the bow shaft 12 holding the arrow 14 in an alined position and the rear end of the arrow shaft 30 engaged with the bow string 13. The bow string 13 is then drawn in the direction of the arrow I of FIGURE 1, during which time the archer or fisherman takes careful aim with the arrow 14 to keep the arrow shaft 30 in parallel relationship with the fishing rod shaft 23. When string 13 is released by the fisherman, the arrow 14 is projected forward and the fishline 26 is rapidly pulled from the opening 25 in the spinning reel 24 in a well known manner.

During the flight of arrow 14, the force exerted on the float 42 by the fishline 26 is insufficient to dislodge the float 42 from the receptacle 31 and the float 42 thus remains in the position of FIGURE 4. When the arrow 14 strikes the water, it floats on the surface of the water as shown in FIGURE 6. When fishing is to be commenced, a tug by the fisherman on the fishline 26 brings the sinker 40 and ring 41 against the inner end of the float 42 so that the float 42 may be pulled, with a sharp movement of the fishline 26, from the open end 32 of the receptacle 31, carrying with it the sinker 40 and baited hook 38. Usually, the arrow 14 flips over in this process so the open end of the receptacle faces the fisherman.

The float 42 then floats on the surface of the water to be fished, as shown in FIGURE 6. The arrow 14 remains attached to the float 42 as a result of the flexible connector 46 and, when the fishline 26 is slackened by the fisherman, the weight of the sinker 40 and baited hook 38 causes the sinker and baited hook to sink as the fishline 26 advances through the float central bore 43. When the baited hook 38 reaches the desired depth, the fisherman tightens the line 26 sufficiently to maintain the baited hook at the desired depth. Thus, under the control of the fisherman, the baited hook 38 may be submerged to a selected depth for fishing.

When a fish is hooked or when fishing is to be terminated, all of the parts including the arrow 14 may be wound up quickly by manual operation of the reel 24 with its handle 27 and all of the parts of the invention may be retrieved.

*Second Form of the Invention*

The second form of the invention shown in FIGURES 8 through 13 differs from the first form of the invention shown in FIGURES 1 through 7 in that the receptacle is provided with a closable opening on one side thereof rather than on the free end thereof, and a cover or closure member is releasably retained in closed position over said opening by a latch mechanism which is actuated to release the closure member by impact of the receptacle with the water. Upon being released from the latch mechanism, yieldable means moves the closure member to open position so the baited hook may fall out of the same. The sudden impact of the receptacle also assists in removing the baited hook from the receptacle.

In many respects, the arrow and receptacle of the second form of the invention are quite similar to the arrow and receptacle of the first form of the invention. Therefore, those parts of the second form of the invention which are identical to or similar to parts of the first form of the invention shall bear the same reference characters with the prime notation added, in order to avoid repetitive description.

In FIGURES 8 through 13, the receptacle is broadly designated at 31' and includes an elongate hollow or tubular body 31a which is preferably, but not necessarily, generally circular in cross-section, but substantially half of which is cut away longitudinally thereof to provide an access opening 31b therein which is adapted to be closed by a closure member 31c. The rear end of body 31a has the plug 33' adhesively or otherwise secured therein or formed integral therewith. This plug 33' is attached to the shaft 30' of arrow 14' in the same manner as heretofore described with respect to the first form of the invention.

Plug 33' may be substantially circular, but one side portion thereof is provided with a pair of closely circularly spaced ears 60 through which a pivot pin 61 extends and which pivotally supports the rear end of the elongate closure member 31c. The rear end of closure member 31c is preferably provided with a slot 62 therethrough, opposed walls for which straddle ears 60. The ears 60 are spaced apart so as to accommodate therebetween the coiled medial portion of a torsion spring or leaf spring 63, one leg of which engages the inner surface of closure member 31c and the other leg of which engages the inner surface of plug 33'.

As heretofore stated, the body 31a of receptacle 31' is preferably substantially circular in cross-section. However, since its major portion is cut away at one side thereof to form the access opening 31b and to accommodate closure member 31c, the major portion of body 31a, and the closure member 31c, are each substantially semi-circular or segmental circular in cross-section. Thus, the front end of body 31a is formed with an annular or endless guide portion 31d within which a front plug or block 65 is positioned. The front plug 65 may be formed integral with or adhesively or otherwise secured in body 31a. Front plug 65 extends rearwardly of annular portion 31d so as to provide a shoulder against which the front portion of closure member 31c may rest when the closure member is in closed position.

In order to releasably retain closure member 31c in closed position, a latch mechanism is provided which comprises a hook-like latch member 66 whose hook portion faces toward the front plug 65 and which is adapted to engage an inwardly and rearwardly projecting hook 67 formed integral with or suitably secured to the inner surface of closure member 31c at a point spaced from, but adjacent, the free front end of closure member 31c.

Latch 66 is fixed to or formed integral with a guide means, shown in the form of a tube 69, which slidably or loosely extends axially through front plug 65 and is attached to a nose member or float 70 which is preferably made from cork or other buoyant material. Tube 69 extends all the way to the front end of float 70 so as to serve as a guide through which the fishline 26' may freely pass. Tube 69 may be attached to float 70 by being pressed into the same or by a suitable adhesive or any other suitable means.

The exterior configuration of the float 70 may vary, although it is desirable that the float 70 is circular, of greater diameter than the diameter of the annular portion 31b of body 31a, and is conically shaped or rounded at its front end. The rear portion of float 70 is provided with a shallow cavity 71 which is preferably circular and whose annular wall is slidably or loosely mounted on the annular portion 31b of body 31a. Since the latch 66 must occupy a position so as to cooperate with hook 67, float 70 may be keyed to body 31a, as at 72.

The bottom of cavity 71 in float 70 may be provided with a recess 74, alined with a recess 75 formed in the outer end of front plug 65, to accommodate a compression spring 76 which surrounds a medial portion of tube 69. Thus, opposed ends of compression spring 76 bear against the bottoms of the respective recesses 74, 75 and normally urge float 70 outwardly relative to body 31a.

The extent of outward movement of float 70 relative to body 31a may be limited in any desired manner. In this instance, the base of latch 66 is so formed that it will engage the inner surface of front plug 65 while its hooked portion remains spaced from front plug 65 sufficiently to accommodate hook 67 when the closure member 31c occupies closed position as shown in FIGURE 9. It is apparent that spring 76 normally maintains the hooked portion of latch 66 in a forward position and in engagement with the hook 67.

From the foregoing, it is apparent that inward or rearward movement of float 70 relative to body 31a may be effected manually or by impact. This moves the hooked portion of latch 66 out of engagement with hook 67, thus releasing closure member 31c so the spring 63 may move the closure member 31c to open position substantially as shown in FIGURE 10. The spring 63 is preferably formed so as to swing the closure member 31c back against or substantially parallel to the shank 30' of arrow 14'.

Since it may frequently happen that the arrow 14' occupies such a position that the closure member 31c is at the lower side of the receptacle 31' when the nose portion 70 thereof strikes the water, an auxiliary spring means may be provided to assist in throwing open the closure member 31c when its hook 67 is released from the latch 66. To this end, a relatively small compression spring 77 is provided, one end of which is engageable by the overlapping portion of closure member 31c forwardly of hook 67 when the closure member 31c occupies closed position. The front plug 65 is preferably provided with a small well or cavity 80 within which spring 77 may be positioned. Spring 77 may be secured in the cavity 80 by being threaded thereinto or by adhesively or otherwise securing the inner end of spring 77 to the bottom of cavity 80. A torsion spring, leaf spring or other yieldable element, may be substituted for spring 77, without departing from the spirit of the invention.

Compression spring 76 is preferably of relatively light construction so that impact of the nose portion or float 70 with the water at the end of flight of the arrow 14 will readily cause the body 31a to move forwardly relative to float 70 and cause the same to momentarily occupy substantially the position shown in FIGURE 10 relative to float 70. It is apparent that this will release closure member 31c so the springs 63, 77 may swing closure member 31c to open position and thus permit the bait 39', hook 38' and sinker 40' to pass outwardly from the receptacle body 31a through the access opening 31b.

The spring 76 should exert sufficiently light pressure against float 70, and sufficient clearance should be provided between the wall of cavity 71 and the annular portion 31b of body 31a, so the receptacle 31' need only strike the water or any other obstruction with a very light impact in order to release the closure member 31c. When the receptacle is to be loaded, the closure member 31c may be released so as to swing from closed to open position by merely pressing the nose 70 inwardly relative to body 31a, inserting the baited hook 38' with the end of the fishline in the body 31a, and then closing the closure member 31c.

In other respects, the second form of receptacle construction 31' functions in the same manner as the first form of receptacle construction and a further detailed description thereof is deemed unnecessary. However, the float 70 remains attached to the receptacle 31' after the closure member 31c has been moved to open position, and in the first form of the invention, the nose member 42 serves both as a closure member for the access opening of the receptacle 31 and as a float. After the receptacle is emptied, the fisherman slackens the fishline 26' and the sinker pulls the line through the tube 69 so the baited hook 38 may be located at the desired fishing depth while the arrow 14 and receptacle 31' remain afloat.

It is thus seen that I have provided an improved fishing apparatus comprising a bow and arrow wherein the shaft of the arrow is provided with a receptacle having a closable opening therein through which a baited hook may be inserted for loading the receptacle, and whereupon the opening may be closed and the arrow may then be projected a substantial distance through the air by the bow. Means are provided for opening the receptacle and emptying the baited hook therefrom, at the end of flight of the arrow, even though the fisherman may be a substantial distance from the arrow at that time, whereupon the fisherman may slacken the fishline to permit the baited hook to sink to the desired fishing depth in water. When the fish grabs the bait, it is apparent that this will cause the receptacle and arrow to shake and the fisherman may then reel in the arrow, receptacle, hook and the ensnared fish, all at the same time.

In the drawings and specification there have been set forth preferred embodiments of the invention and, although specific terms are employed, they are used in a generic and descriptive sense only and not for purposes of limitation, the scope of the invention being defined in the claims.

I claim:

1. A bait casting apparatus adapted to be projected through the air by an archer's bow comprising an elongate arrow-like shaft, a receptacle carried by and projecting from one end of said shaft and being adapted to contain bait and fish ensnaring means therein, said receptacle comprising an elongate hollow body having an opening in one side thereof, a closure member movable between a closed position over said opening and an open position away therefrom, movable latch means normally retaining said closure member in closed position, a nose member mounted for axial movement on the end of said receptacle opposite from said shaft, means connecting said nose member with said latch means, first yieldable means urging said latch means toward latching position and also urging said nose member away from said receptacle, and said nose member and latch means being so arranged that impact of said receptacle with an obstruction causes said nose member to oppose said yieldable means and move, with the latch means, toward said shaft for releasing said closure member from said latch means.

2. A structure according to claim 1 including second yielding means for uring said closure member to open position upon said closure member being released from said latch means.

3. A structure according to claim 2 wherein the means connecting said nose member with said latch means comprises a tube guided for axial movement in the end of said receptacle opposite from said shaft, said tube penetrating said nose member and being attached thereto whereby the fishline may extend loosely through said tube into said receptacle.

4. A structure according to claim 2 including third auxiliary yieldable means for imparting outward movement to said closure member upon said latch means being released.

5. A bait casting apparatus adapted to be projected through the air by an archer's bow comprising an elongate arrow-like shaft, a receptacle carried by and projecting from one end of said shaft and being adapted to contain bait and fish ensnaring means therein, said receptacle comprising an elongate hollow body having an opening in one side thereof, a closure member movable between a closed position over said opening and an open position away therefrom, movable latch means normally retaining said closure member in closed position, a nose member mounted for axial movement on the end of said receptacle opposite from said shaft, means connecting said nose member with said latch means comprising a tube guided for axial movement in the end of said receptacle opposite from said shaft, said tube penetrating said nose member and being attached thereto whereby the fishline may extend loosely through said tube into said receptacle, yieldable means urging said latch means toward latching position and also urging said tube and said nose member in a direction away from said receptacle whereby, upon impact of said nose member with an obstruction, the nose member opposes said yieldable means and moves, with the tube and the latch means, toward said shaft for releasing said closure member from said latch means.

References Cited in the file of this patent

UNITED STATES PATENTS

| | | |
|---|---|---|
| 2,531,418 | Fritzharris | Nov. 28, 1950 |
| 2,703,466 | Badovinac | Mar. 8, 1955 |

FOREIGN PATENTS

| | | |
|---|---|---|
| 977,652 | France | Nov. 15, 1950 |
| 1,075,821 | France | Apr. 14, 1954 |